Aug. 23, 1955   J. STURROCK   2,715,889
REVERSING PNEUMATIC MOTOR

Filed Nov. 5, 1952   2 Sheets-Sheet 1

INVENTOR.
JAMES STURROCK
BY
RICHEY, WATTS, EDGERTON & McNENNY
ATTORNEYS

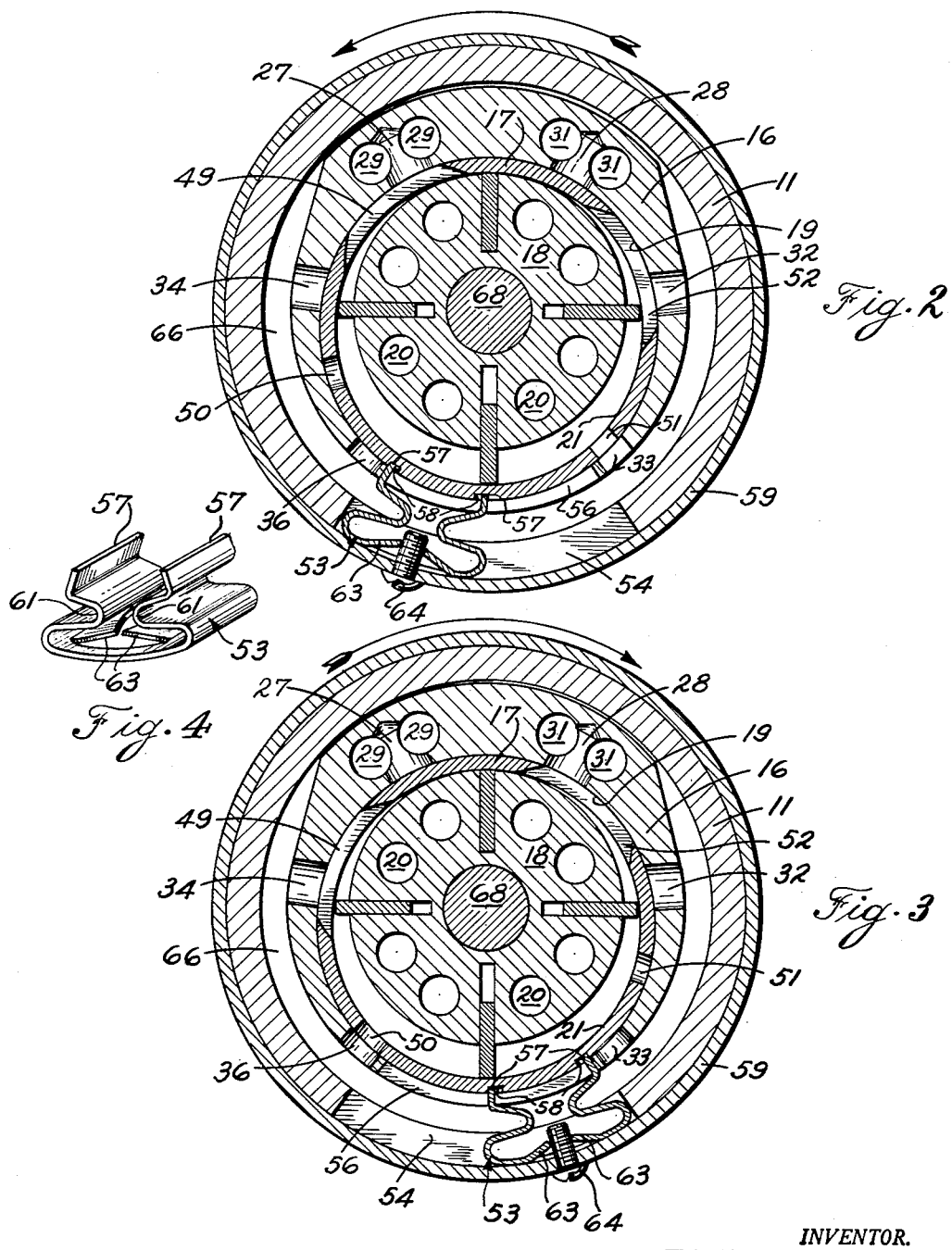

United States Patent Office 2,715,889
Patented Aug. 23, 1955

2,715,889

REVERSING PNEUMATIC MOTOR

James Sturrock, Orwell, Ohio, assignor to Master Pneumatic Tool Company

Application November 5, 1952, Serial No. 318,781

9 Claims. (Cl. 121—34)

This invention relates generally to reversible pneumatic motors and more particularly to reversible pneumatic motors to be used in power tools such as screw drivers, wrenches and the like.

It has been recognized that pneumatic motors are ideal for powering wrenches, screw drivers and other power driven tools since large amounts of power may be developed with a very small compact motor. It is highly desirable in many applications to provide a reversible motor so that the same tool may be used for both running up and backing off nuts and bolts. Difficulty, however, has been encountered in developing such a motor for use in applications wherein it is necessary to reverse the direction of rotation.

It is an important object of this invention to provide a pneumatic motor which may be easily reversed for use in portable power tools.

It is another object of this invention to provide the simplified reversing mechanism for use in conjunction with high speed pneumatic motors.

Past attempts to provide a reversible high speed pneumatic motor, have utilized a stator within which a rotor is mounted for rotation. A reversing valve sleeve has been mounted on the outside of the stator to provide for reversing of the motor. These stators and the valve sleeves have been formed with porting wherein proper inlet and exhaust ports were aligned to provide rotor rotation in one direction when the sleeve was in one position. The sleeve and the stator were also arranged so that moving the sleeve to another position rearranged the inlet and exhaust ports so that the rotor rotated in the opposite direction. Such structures have been difficult to fabricate since it has been necessary to devise elaborate means for assembling the sleeve on the outside of the stator within the housing or casing of the tool.

A fluid motor according to this invention provides a stator bored to receive an internal valve sleeve which, in turn, serves as a cylinder wall for the rotor. Since the stator is external to the sleeve it may be easily and securely mounted in the tool casing or frame without elaborate mounting means. Since the stator is not subject to the wear in motors according to this invention, additional saving may be realized by machining the stator from an easily machinable low cost metal.

The foregoing and other objects and advantages will become apparent in view of the following description taken in conjunction with the drawings, wherein:

Fig. 2 is an enlarged cross sectional view showing the preferred porting when the motor is positioned for counterclockwise rotation;

Fig. 3 is a cross sectional view similar to Fig. 2 wherein the valve sleeve is rotated to provide clockwise rotation of the motor; and Fig. 4 is an enlarged perspective view of the spring clip utilized to move the valve sleeve from the position shown in Fig. 2 to the position shown in Fig. 3.

Figure 1:
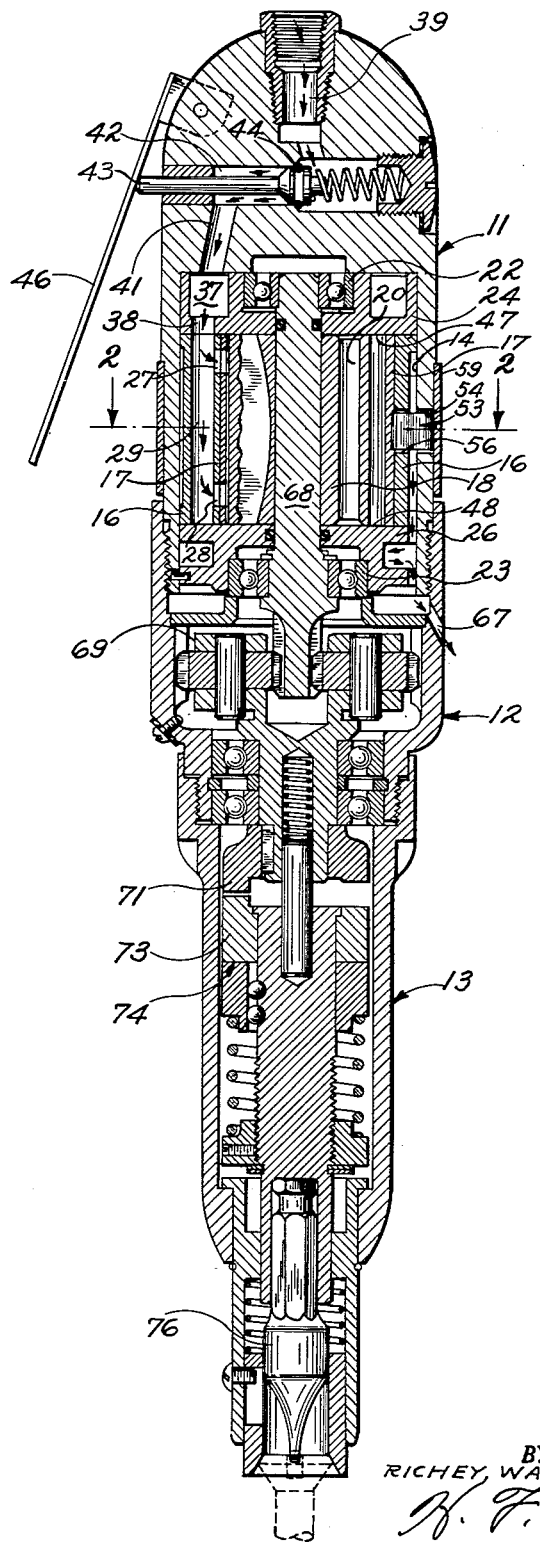
Fig. 1 is a cross sectional view of a fluid motor incorporating this invention as applied to a screw driver.

Referring to Fig. 1, a reversible fluid motor incorporating this invention is shown as adapted to an impact power screw driver. The screw driver includes a motor housing 11, a gear box housing 12 and an impact drive housing 13. The motor housing 11 is bored as at 14 to receive the reversible pneumatic motor. The pneumatic motor includes a stator 16, a valve sleeve 17 and a rotor 18. The stator 16 is provided with an offset axial bore 19 in which the valve sleeve 17 is positioned and the rotor 18 is mounted for rotation within the bore 21 in the valve sleeve 17. Longitudinal bores 20 are provided in the rotor 18 to reduce the weight thereof. Frictionless bearings 22 and 23 are provided to support the rotor 18 within the sleeve 17. Bearing supports 24 and 26 are mounted within the bore 14 in the housing 11 to support the bearings 22 and 23 respectively. The stator 16 is also mounted within the bore 14 and is positioned between the bearing supports 24 and 26. The stator 16 is provided with inlet ports 27 and 28. Axial passages 29 and 31 are formed in the stator to provide fluid connection between the inlet ports 27 and 28 respectively. Circumferentially spaced radial exhaust ports 32 and 33 are formed in the stator 16 and are arranged to cooperate with the inlet ports 27 and the additional exhaust ports 34 and 36 are provided in the stator to cooperate with the inlet ports 28. The spacing of the various inlet and exhaust ports is arranged so that when fluid under pressure is admitted through the inlet ports 27 and exhausted through the exhaust ports 32 and 33, the rotor rotates in a counterclockwise direction and when the inlet port 28 and the exhaust ports 34 and 36 are used, the rotor rotates in a clockwise direction. The bearing support 24 is formed with an annular recess 37 in fluid communication with the passages 29 and 31 through the passages 38.

The motor housing 11 is formed with an inlet passage 39 adapted for connection with any suitable source of fluid under pressure. Additional passages 41 and 42 formed in the motor housing 11 provide fluid communication between the inlet passage 39 and the annular recess 38. A normally closed valve member 43 is adapted to seat against the valve seat 44 and isolate the passage 42 from the inlet passage 39 thereby serving as a shut off valve for the motor. An actuating arm 46 is adapted to engage the valve member 43 and open the valve when the fluid motor is to be operated.

The bearing supports 24 and 26 are formed with smooth end faces 47 and 48 respectively which engage the ends of the stator 16 thereby defining the end walls of the cylinder.

The valve sleeve 17 is formed with a plurality of radial passages 49 through 52. The passages 49 through 52 are arranged so that fluid communication is provided between the inlet ports 27, the exhaust ports 32 and 33 and the cylinder when the valve sleeve is in the position shown in Fig. 2. The passages 49 through 52 are also arranged so that fluid communication is provided between the inlet port 28, the exhaust ports 34 and 36 and the cylinder when the valve sleeve is in the position shown in Fig. 3. By merely moving the valve sleeve 17 between the positions shown in Fig. 2 and Fig. 3 it is possible to open the correct inlet ports and their associated exhaust ports to provide for the desired direction of rotation of the rotor 18. The porting of the sleeve 17 and the stator 16 is arranged so that the passage 49 is aligned with the inlet 27 and the passage 52 is aligned with the exhaust 32 when the sleeve is in the position shown in Fig. 2. The porting is also arranged so that the passage 49 is aligned with the exhaust 34 and the passage 52 is aligned with the inlet 28 when the sleeve 17 is in the position shown in Fig. 3. By utilizing this arrangement the number of passages may be reduced since two of the passages in the sleeve 17 are used for both inlet and exhaust.

In order to provide for moving the valve sleeve 17 between the position shown in Figs. 2 and 3 a spring clip 53 is provided. The spring clip extends from the outer surface of the motor housing 11 through the slot 54 formed therein and the slot 56 formed in the stator. The inner ends 57 of the spring clip 53 extend into shallow grooves 58 formed in the outer surface of the valve sleeve 17 and engage the walls of the grooves 58. The outer surface of the spring clip 53 is bolted to the reversing collar 59 which extends around the motor housing 11. Since the radial spacing between the outer surface of the valve sleeve 17 and the outer surface of the motor housing 11 varies as the valve sleeve is rotated due to the fact that the two surfaces do not have the same center, the spring clip 53 is formed of a resilient material. To add to the flexibility of the spring clip 53 the effective length is increased by forming the spring clip with the reverse bends 61. The outer surface of the spring clip 53 is longitudinally cut to provide ears 63 which engage the bolt 64 used to fasten the spring clip 53 to the reversing collar 59.

The spring clip 53 is formed so that the ends 57 are urged toward each other by the walls of the grooves 58 and also formed so that the ends 57 press against the bottom walls of the grooves 58 even in a position wherein the distance between the sleeve 17 and the collar 59 is greatest, thereby eliminating any play between the spring clip 53 and the valve sleeve 17.

When assembling the reversing collar 59 and the spring clip 53, the clip is inserted through the slots 54 and 56 into the grooves 58 in the sleeve 17 and compressed so that the collar 59 can be slipped over the clip. When the two parts are aligned the bolt 64 is inserted thereby completing the installation. The width of the spring clip is such that the walls of the slots 54 and 56 prevent tipping of the clip as the collar is slipped into place.

An exhaust passage 66 is provided between the stator and the motor housing which is in fluid communication with the exhaust ports 32, 33, 34 and 36 and the exhaust outlet 67 in the gear box housing 12.

A person skilled in the art will realize that the above described motor structure is not only easier and more economical to fabricate but that the structure lends itself to simple, light weight, simplified construction. The stator 16 is easily mounted within the bore 14 in the motor housing 11 and the valve sleeve 17 is accurately positioned by the bore 19 in the stator 16 by the end faces 47 and 48 of the bearing supports 24 and 26. The valve sleeve 17 which forms the cylinder walls of the motor must necessarily be made of a material capable of withstanding the wear of the rotor as the motor operates. It is, of course, far simpler to machine such materials to the simple annular sleeve shape than it would be to machine this material to the rather intricate shape necessary for the stator.

The shaft 68 of the rotor 18 forms the sun gear of a planetary gearing 69 which reduces the rotative speed of the rotor to a speed usable in power tools. The planetary gearing in turn drives the driving jaw 71 of the clutch. The driven jaw 73 is arranged to slide axially into engagement with the jaw 71 and, in turn, through the impact drive 74 drive the screw driver blade 76. The planetary gearing 69, the jaw clutch 72 and the impact drive 74 form no part of this invention but are merely disclosed as environment to the motor.

Having completed a detailed description of a preferred embodiment of the present invention so that others skilled in the art may be able to understand and practice the same, I state that what I desire to secure by Letters Patent is not limited by said preferred embodiment but rather is defined in what is claimed.

What is claimed is:

1. A reversible fluid actuated motor comprising a cylindrical motor housing formed with an axial bore, a stator positioned in said housing bore formed with a bore having an axis parallel to and spaced from the axis of said housing bore, tubular valve sleeve means positioned in said stator bore rotatable from a first position to a second position, a rotor mounted for rotation in said sleeve means, an annular reversing collar rotatably mounted on and surrounding said housing co-axial therewith, and radially resilient drive means extending between said sleeve means and said reversing collar rotating said sleeve means when said reversing collar is rotated.

2. A reversible fluid actuated motor comprising a stator formed with an axial bore, a tubular valve sleeve rotatable between a first and second position in said bore, a rotor mounted for rotation within said sleeve, said stator formed with circumferentially spaced inlet ports and associated exhaust ports for each inlet port, fluid conducting passage means connecting said inlet ports, valve means connecting said fluid connecting passage means with a source of fluid under pressure, said sleeve formed with a plurality of circumferentially spaced passages through the wall thereof, the circumferential spacing of said passages in said sleeve and said ports in said stator arranged so that the inside of said sleeve is in fluid communication with only one of said inlet ports and its associated exhaust ports when said sleeve is in said first position, and the inside of said sleeve is only in fluid communication with the other inlet port and the other corresponding exhaust ports when said sleeve is in said second position, and sleeve drive means for moving said sleeve between said first and second positions.

3. A reversible fluid actuated motor comprising a stator formed with an axial bore, a tubular valve sleeve rotatable between a first and second position in said bore, a rotor mounted for rotation within said sleeve, said stator formed with two groups of circumferentially spaced inlet ports and associated exhaust ports for each group of inlet ports, fluid conducting passage means connecting all of said inlet ports, valve means connecting said fluid connecting passage means with a source of fluid under pressure, said sleeve formed with a plurality of circumferentially spaced passages through the wall thereof, the circumferential spacing of said passages in said sleeve and said ports in said stator arranged so that the inside of said sleeve is in fluid communication with only one group of said inlet ports and its associated exhaust ports when said sleeve is in said first position, and the inside of said sleeve is only in fluid communication with the other group of inlet ports and the other corresponding exhaust ports when said sleeve is in said second position, and sleeve drive means for moving said sleeve between said first and second positions.

4. A fluid actuated motor comprising a housing, a stator, a valve sleeve, a rotor, an annular reversing collar wherein said valve sleeve is mounted for rotational movement about an axis displaced from the axis of said collar, and a resilient clip drive means extending between said sleeve and collar whereby rotational motion of said collar about its axis results in rotational motion of said sleeve about its axis.

5. A fluid actuated motor comprising a housing, a stator, a valve sleeve, a rotor, an annular reversing collar wherein said valve sleeve is mounted for rotational movement about an axis displaced from the axis of said collar, and a resilient clip drive means extending between said sleeve and collar whereby rotational motion of said collar about its axis results in rotational motion of said sleeve about its axis, said clip formed of resilient metal bolted to said collar and having radially resilient legs extending into circumferentially spaced grooves formed in said sleeve.

6. A fluid actuated motor comprising a housing, a stator, a valve sleeve, a rotor, an annular reversing collar wherein said valve sleeve is mounted for rotational movement about an axis displaced from the axis of said collar, and a resilient clip drive means extending between said sleeve and collar whereby rotational motion of said collar about its axis results in rotational motion of said sleeve about its axis, said clip formed of resilient metal bolted to said collar and having radially resilient legs extending into circumferentially spaced grooves formed in said sleeve, the walls of said grooves urging said legs toward each other.

7. A fluid actuated motor comprising a housing, a stator, a valve sleeve, a rotor, an annular reversing collar wherein said valve sleeve is mounted for rotational movement about an axis displaced from the axis of said collar, and a resilient clip drive means extending between said sleeve and collar whereby rotational motion of said collar about its axis results in rotational motion of said sleeve about its axis, said clip formed of resilient metal bolted to said collar and having radially resilient legs extending into circumferentially spaced grooves formed in said sleeve, the bottom walls of said grooves urging said resilient legs toward said reversing collar.

8. A reversible fluid actuated motor comprising a stator formed with an axial bore, a tubular valve sleeve rotatable between a first and second position in said bore, a rotor mounted for rotation within said sleeve, said stator formed with circumferentially spaced inlet ports and associated exhaust ports for each inlet port, fluid conducting passage means connecting all of said exhaust ports, valve means connecting said inlet ports with a source of fluid under pressure, said sleeve formed with a plurality of circumferentially spaced passages through the walls thereof; the circumferential spacing of said passages in said sleeve and said ports in said stator arranged so that the inside of said sleeve is in fluid communication with only one of said inlet ports and its associated exhaust ports when said sleeve is in said first position, the inside of said sleeve is only in fluid communication with the other inlet port and the other corresponding exhaus ports when said sleeve is in said second position, and sleeve drive means for moving said sleeve between said first and second positions.

9. A reversible fluid actuated motor comprising a stator formed with an axial bore, a tubular valve sleeve rotatable between a first and second position in said bore, a rotor mounted for rotation within said sleeve, said stator formed with circumferentially spaced inlet ports and associated exhaust ports for each inlet port, valve means connecting said inlet ports with a source of fluid under pressure, said sleeve formed with a plurality of circumferentially spaced passages through the walls thereof; the circumferential spacing of said passages in said sleeve and said ports in said stator arranged so that the inside of said sleeve is in fluid communication with only one of said inlet ports and its associated exhaust ports when said sleeve is in said first position, the inside of said sleeve is only in fluid communication with the other inlet port and the other corresponding exhaust ports when said sleeve is in said second position, and sleeve drive means for moving said sleeve between said first and second positions, at least one of said spaced passages in said valve sleeve providing fluid communication between the inside of said sleeve and an inlet port when said sleeve is in one position and between the inside of said sleeve and an exhaust port when said sleeve is in the other position.

References Cited in the file of this patent
UNITED STATES PATENTS

| | | |
|---|---|---|
| 2,257,892 | Van Sittert et al. | Oct. 7, 1941 |
| 2,337,897 | Jimerson | Dec. 28, 1943 |
| 2,401,190 | Reynolds | May 28, 1946 |
| 2,575,524 | Mitchell | Nov. 20, 1951 |